United States Patent [19]

Morikawa et al.

[11] 3,939,131

[45] Feb. 17, 1976

[54] 2,4-DIMETHYL-4-VINYL-1-CYCLOHEXENE-2,6- OR 3,6-DIMETHYL-1,3,6-OCTATRIENE COPOLYMER RESIN

[75] Inventors: Hiroyuki Morikawa; Tosio Sugimoto; Kazuo Sato, all of Ami, Japan

[73] Assignee: Mitsui Petrochemical Industries, Inc., Tokyo, Japan

[22] Filed: Aug. 19, 1974

[21] Appl. No.: 498,403

[30] Foreign Application Priority Data

Aug. 22, 1973 Japan.................................. 48-93361

[52] U.S. Cl............ 260/80.7; 260/4 R; 260/28.5 A; 260/80.78; 260/88.2 D; 260/666 R; 260/680 B; 428/356; 428/462

[51] Int. Cl.²........................................ C08F 236/22

[58] Field of Search........... 260/88.2 D, 80.78, 80.7; 450/733.5, 744

[56] References Cited
UNITED STATES PATENTS 2,567,918  9/1951  Burroughs.......................... 260/88.1
3,522,321  7/1970  DeYoung............................ 260/666

*Primary Examiner*—Stanford M. Levin
*Attorney, Agent, or Firm*—Sherman & Shalloway

[57] ABSTRACT

A copolymer of 2,4-dimethyl-4-vinyl-1-cyclohexene and at least one member of the group consisting of 2,6- and 3,6-dimethyl-1,3,6-octatrienes, which copolymer is suitable for use as a tackifier, said copolymer consisting essentially of (A) structural units derived from 2,4-dimethyl-4-vinyl-1-cyclohexene and (B) structural units derived from at least one member selected from the group consisting of 2,6- and 3,6-dimethyl-1,3,6-octatriene in proportions of 100 moles of (A) to 1 to 400 moles of (B) and characterized by containing not more than seven unsaturated double bonds per 100 carbon atoms contained in its molecule and having a softening point of 85°–160°C. and an average molecular weight of 450–1850 is disclosed.

21 Claims, No Drawings

2,4-DIMETHYL-4-VINYL-1-CYCLOHEXENE-2,6- OR 3,6-DIMETHYL-1,3,6-OCTATRIENE COPOLYMER RESIN

This invention relates to a tacky resin suitable for use as a tackifier and a process for its preparation.

The polyterpene resin has been used hitherto as a tackifier resin of the highest grade, but this resin has the drawback that its starting material is the naturally produced terpenic essential oil whose production is limited and whose supply and price are unstable.

On the other hand, the demand for tackifier resins has been increasing greatly in recent years. Hence, the development of a tackifier resin having as its starting material a petrochemical product that can be supplied in large and steady amounts is being hoped for, and various suggestions have been made to meet this demand. For example, the petroleum resins having $C_9$ aromatic or $C_5$ aliphatic unsaturated hydrocarbons have been suggested. However, these resins have such drawbacks as in the case of the aromatic type petroleum resins their cohesion was great and they were brittle, whereas in the case of the aliphatic type petroleum resins their softening point was too low, with the consequence that limitations were imposed on the uses to which these resins could be put. As resins not having these drawbacks, the alicyclic resins can be mentioned, and various copolymeric resins having as their predominant constituent alpha-pinene and beta-pinene, which are obtained from natural substances, have been suggested (e.g. Japenese Patent Publications Nos. 7388/72 and 21578/72 and U.S. Pat. No. 2,567,918). Since these resins also depend on naturally obtained substances, such drawbacks as limitations on the supply of the starting materials as well as the instability of their prices are present.

It is therefore an object of the present invention to provide a polymer suitable for use as a tackifier, which can be synthesized from readily available starting materials.

Another object of this invention is to provide a polymer suitable for use as a tackifier, the discoloration and loss by heat of which are small and whose aging resistance is superior.

It is still a further object to provide a solvent-saluble polymer which may be used as a tackifier for an adhesive having tack, adhesiveness and cohesion equal to that of an adhesive which employs a polyterpene resin as a tackifier.

The foregoing objects of the present invention are achieved by a copolymer of 2,4-dimethyl-4-vinyl-1-cyclohexene and 2,6- and/or 3,6-dimethyl-1,3,6-octatriene, said copolymer consisting essentially of: (A) structural units of 2,4-dimethyl-4-vinyl-1-cyclohexene, (B) structural units of 2,6-dimethyl-1,3,6-octatriene and/or 3,6-dimethyl-1,3,6-octatriene in proportions of 100 moles of (A) to 1–400 moles of (B), and containing not more than seven unsaturated double bonds per 100 carbon atoms of the copolymer molecule and having a softening point of 85°–160°C. and an average molecular weight of 450–1850. This copolymer is suitable for use as a tackifier.

The foregoing copolymer of this invention is a new copolymer. This copolymer can be prepared by copolymerizing 2,4-dimethyl-4-vinyl-1-cyclohexene with 2,6-dimethyl-1,3,6-octatriene and/or 3,6-dimethyl-1,3,6-octatriene in a molar ratio of 100:1 to 100:300 in the presence of a cationic polymerization catalyst. The 2,4-dimethyl-4-vinyl-1-cyclohexene (DMVCH) available in great quantities from petrochemical processing being a cyclic dimer is an alicyclic unsaturated compound similar to for example, alpha-pinene.

According to our researches, the reactivity of DMVCH, when used alone, is low. Even though the polymerization reaction is carried out using, say, a Friedel-Crafts type cationic polymerization catalyst (metal halides), only polymers in the liquid state can be obtained. Again, even though a catalyst system consisting of a combination of a co-catalyst, such as an alkyl halide or a halogenated silane derivative, with the foregoing cationic polymerization catalyst is used, it is difficult to obtain in good yield a resin having a high softening point that is required of a tackifier resin. However, it was found that if DMVCH was copolymerized with a dimethyloctatriene, i.e., 2,6-dimethyl-1,3,6-octatriene and/or 3,6-dimethyl-1,3,6-octatriene, in the presence of a suitable catalyst, a resin of high softening point of at least about 85°C. and having the properties suitable for use as a tackifier resin could be readily obtained.

In spite of the fact that the new copolymer of this invention contains structural units derived from trienes, the infrared absorption spectrum and the nuclear magnetic resonance spectrum analyses and the chemical analysis of an iodine value, etc. surprisingly show that it contains hardly any unsaturated bonds of vinyl and butenyl in its molecular chain, the number of such unsaturates being not greater than seven per 100 carbon atoms of the polymer. Since the copolymer resin of the invention contains a markedly small number of unsaturated bonds, it is excellent in change of color shade at the time of heating, heat decreasing factor at the time of heating and aging resistance. Again, this copolymer resin is soluble in solvents and does not become gelled in structure. It is thus presumed from these facts that the side chains of the invention copolymer do not cross-link but form a cyclic structure. That is to say, the copolymer formed by copolymerizing in accordance with the invention process an alicyclic type monomeric DMVCH with a chain aliphatic type dimethyloctatriene is not a simple copolymer having alicyclic and chain structures in its side chains, but is presumed to be a unique new copolymer having alicyclic structures in both its side and main chains. Moreover, the dimethyloctatriene has the effect of increasing the molecular weight of the resulting copolymer resin in this case. In addition, it becomes possible by controlling the proportion in which the dimethyloctatriene is copolymerized with DMVCH to freely adjust the softening point of the resulting resin to come within the high softening point zone (85°–160°C.), a requirement that a resin must possess to qualify as a tackifier resin.

Accordingly, the invention copolymer has a softening point of about 85°–160°C., preferably 90°–130°C., and more preferably 100°–120°C., and a molecular weight of 450–1850.

The invention copolymer possesses superior thermal stability, and its weight loss when heated at 150°C. in air for 10 hours is no more than 2%. Again, the invention copolymer has the advantage that it compares favorably with the commercial natural terpene resins in its superior solubility and compatibility, properties the possession of which are of essential importance to a tackifier. That is to say, it readily dissolves in many of the aliphatic, aromatic and chlorinated hydrocarbon solvents, and possesses superior compatibility with such substances as rubber, polyolefins, waxes, drying oil, alkyd resins and chlorinated paraffin. Again, with respect to such properties as tack (initial adhesiveness), adhesiveness and cohesion that are required of a resin when used as a tackifier for a pressure sensitive adhesive tape, the invention copolymer possesses these properties to a degree comparable to that of the commercial terpene resins. It is possible by varying the proportion of the monomers used in preparing the invention copolymer to adjust the proportions of the copolymeric structural units derived from the monomers so as to come within the range of 1–400 moles, preferably 30–150 moles, and more preferably 60–100 moles, of the dimethyloctatriene units per 100 moles of the DMVCH units. By such an adjustment, it becomes possible to change the balance that exists between the properties of tack, adhesiveness and cohesion. For instance, it is possible to prepare a copolymer that exhibits tack greater than that of the commercial terpene resins. When the content of the structural units derived from dimethyloctatriene is insufficient, the softening point of the copolymer becomes unduly low. On the other hand, when the structural units derived from dimethyloctatriene are in excess, the softening point becomes excessively high. The invention copolymer also has the advantage that its discoloration and loss by heat are less, as well as that its aging resistance is good. These properties are especially useful for hot-melt adhesives, whose fields of application are lately showing an increase.

The starting 2,4-dimethyl-4-vinyl-1-cyclohexene (DMVCH) used in this invention has the following structure. It corresponds to the cyclic dimer of isoprene and can be readily prepared by the dimerization reaction of isoprene obtained in the petrochemical industry.

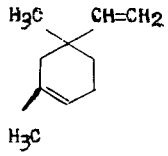

2,4-dimethyl-4-vinyl-1-cyclohexene (DMVCH)

On the other hand, dimethyloctatriene, the other starting material in this invention, has one of the following two structural formulas. Both correspond to the chain dimers of isoprene and can likewise be readily prepared by the dimerization reaction of the petrochemical product isoprene.

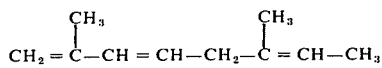

2,6-dimethyl-1,3,6-octatriene

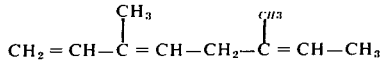

3,6-dimethyl-1,3,6-octatriene

In the present invention, either 2,6-dimethyl-1,3,6-octatriene or 3,6-dimethyl-1,3,6-octatriene may be copolymerized with DMVCH, or both 2,6- and 3,6-dimethyl-1,3,6-octatrienes may be used conjointly in their copolymerization with DMVCH. The DMVCH and dimethyloctatrienes are used in the copolymerization reaction in proportions of usually from 1.0 part by weight to 300 parts by weight, preferably 10 to 100 parts by weight, and more preferably 20 to 80 parts by weight, of dimethyloctatrienes per 100 parts by weight of DMVCH.

The foregoing DMVCH and dimethyloctatrienes used in the present invention are obtained simultaneously in the form of a mixture of these compounds from the dimerization of isoprene, and the proportion in which the DMVCH and dimethyloctatrienes are present in the reaction product can be adjusted as desired by a suitable choice of the conditions of the dimerization reaction and the catalyst. Hence, the reaction mixture can be used as the starting material for preparing the copolymer.

The method of preparing the foregoing DMVCH and dimethyloctatrienes is known.

In carrying out the copolymerization of the present invention, such unsaturated monomers other than DMVCH and dimethyloctatrienes as, for example, isoprene, butadiene, cyclopentadiene, styrene, alpha-methylstyrene and isobutylene can also be copolymerized in a small amount of the order that it does not adversely affect the properties of the resulting resin. The yield of the copolymer can be increased by copolymerizing these comonomers. Again, it becomes possible to readily prepare copolymers having a relatively high softening point.

These monomers are generally used in an amount of 1–100 parts by weight per 100 parts by weight of DMVCH.

Any of the cationic polymerization catalysts can be used in the copolymerization of this invention. Examples of preferred polymerization catalysts include the halides of the Friedel-Crafts type catalysts, e.g., aluminum bromide, boron trifluoride, aluminum chloride, stannous chloride and titanium tetrachloride; alkyl aluminum halides, e.g., alkyl aluminum dihalides such as ethylaluminum dichloride and aluminum sesquihalides such as ethylaluminum sesquichloride. It is also possible to use a catalyst system obtained by combining an organic halide, e.g., methyl chloride, ethyl chloride, propyl chloride, tertiary butyl chloride, secondary butyl chloride and benzyl chloride, or a halogenated silane compound, e.g., trimethylchlorosilane and phenyldimethylchlorosilane with the foregoing polymerization catalyst as a co-catalyst. The amount of the cationic polymerization catalyst used is 0.05–15% by weight, and preferably 3–6% by weight, based on the starting monomeric mixture, while the amount of the cocatalyst used is 0.25–8% by weight, and preferably 0.8–6% by weight, based on the starting monomeric mixture.

A reaction solvent is desirably used in carrying out the polymerization reaction of the present invention. Usable as such solvent are the hydrocarbon solvents and the halogenated hydrocarbon solvents. For example, the aromatic hydrocarbon solvents such as benzene, toluene, p-xylene and ethylbenzene, and the chlorinated hydrocarbon solvents such as methylene chloride and ethylene dichloride can be used. An especially preferred solvent is benzene. While the amount of solvent used has no great effect on the reaction itself, it greatly affects the handling of the polymerization product. For example, in the case where benzene is used as the solvent, if it is used in a proportion of less than about 10% by weight, the polymerization reaction liquid containing the resulting resin becomes highly viscous, with the consequence that difficulty is experienced in its handling. On the other hand, even though the benzene is used in large amounts of over 200% by weight based on the starting monomeric mixture, no particular advantages are had, and hence the use of benzene in such large amounts is uneconomical.

While no particular restrictions are imposed as to the conditions under which the invention copolymerization reaction is conducted, a reaction temperature ranging from $-80°\sim 80°C$., and preferably $0°\sim 40°C$., and a reaction pressure in the range $1-20$ kg/cm$^2$, and preferably $1-5$ kg/cm$^2$, are usually used, while the reaction time ranges usually from several minutes to 10 hours, and preferably 30 minutes to several hours.

For the purpose of removing the residual catalyst, it is a desirable practice in the present invention to submit the reaction product to washing in an acid or alkali, washing with water and filtration. Furthermore, for the removal of the solvent, unreacted monomers and low molecular weight products, steam distillation and vacuum distillation are usually carried out.

This invention is more specifically illustrated by the following examples, which serve to illustrate the invention but are not intended to limit it thereto. In the examples the parts and percentages are on a weight basis unless otherwise specified. The physical properties of the polymers shown in the examples were measured in the following manner.

Softening point:

The softening point is measured in accordance with ASTM Method E - 28.

Weight loss on heating:

A sample of given weight is heated at 150°C. for 10 hours in an electric furnace, following which the sample is weighed, the rate of weight loss being obtained as follows:

Weight loss on heating = A - B/A x 100% where

A is the original weight of the sample, and

B is the weight of the sample after heating.

Number of double bonds per 100 carbon atoms:

The number was determined in accordance with the measurement of an iodine value [Nijs method using iodine monochloride (ICl)].

Molecular weight:

The number-average molecular weight determined by using a vapor pressure osmometer (model 302) of Mechrolab Inc., U.S.A. and benzene as a solvent.

EXAMPLE 1

A four-necked 100-ml flask fitted with a stirrer, a thermometer, a dropping funnel and a gas inlet line was purged with nitrogen. This flask was then charged with 26.4 grams of benzene and 0.80 gram of aluminum chloride (anhydrous; this will apply equally hereinafter), and the mixture was rendered into a slurry. This was followed by the addition of 0.84 gram of secondary butylchloride as co-catalyst, after which the temperature was adjusted to 0°-5°C. A mixture of 11.5 grams of DMVCH and 4.9 grams of 2,6-dimethyl-1,3,6-octatriene (2,6-DMOT) was then placed in a dropping funnel and slowly added dropwise during a period of 30-40 minutes. After completion of the addition, the temperature was immediately raised to 30°C., and while maintaining this temperature the reaction mixture was stirred for 6 hours.

A mixture of 3.9 grams of caustic soda and 8.1 grams of normal butanol was then added to the reaction mixture to deactivate the catalyst, following which the residual catalyst and alkali were removed by washing the reaction mixture with water. This was followed by submitting the reaction mixture to steam distillation to remove the benzene, normal butanol, unreacted monomers and oily low molecular weight substances.

11.0 grams of a yellow polymer was thus obtained. This polymer had a softening point of 104°C. and a molecular weight of 680. It contained four double bonds per 100 carbon atoms. Furthermore, this polymer contained 59 mol% of units derived from DMVCH and 41 mol% of units derived from 2,6-DMOT.

EXAMPLES 2-5

The polymerization reaction was carried out as in Example 1, except that instead of the monomeric mixture that was used therein 16.4 grams of monomeric mixtures of DMVCH and 2,6-dimethyl-1,3,6-octatriene in the proportions shown in Table 1 were used, following which the after treatment was carried out likewise as in Example 1. The yields, compositions and physical property values of the resulting polymers are shown in Table 1.

CONTROL 1

Example 1 was repeated but using 16.4 grams of DMVCH alone instead of the monomeric mixture that was used therein. 10.2 Grams of a polymer having a molecular weight of 435 and a softening point of 73°C. was obtained.

CONTROL 2

The reaction was operated exactly as in Example 1, except that 16.4 grams of 2,6-DMOT was used along instead of the monomeric mixture used therein. There was gelling of the product.

Table 1

|  | Proportion of Monomers Used (mol %) | | Composition of Resulting Polymer (mol %) | | Number of Double Bonds Per 100 Carbon Atoms | Softening Point (°C) | Molecular Weight | Yield (g) |
|---|---|---|---|---|---|---|---|---|
|  | DMVCH | DMOT * | DMVCH | DMOT * |  |  |  |  |
| Example 1 | 70 | 30 | 59 | 41 | 4 | 104 | 680 | 11.0 |
| " 2 | 80 | 20 | 73 | 27 | 4 | 91 | 500 | 11.5 |
| " 3 | 70 | 30 | 59 | 41 | 4 | 104 | 620 | 11.0 |
| " 4 | 60 | 40 | 53 | 47 | 5 | 110 | 890 | 13.6 |
| " 5 | 50 | 50 | 41 | 59 | 5 | 124 | 1100 | 13.1 |
| Control 1 | 100 | 0 | 100 | 0 |  | 73 | 435 | 10.2 |
| " 2 | 0 | 100 | 0 | 100 |  | Gelled |  | 16.4 |

DMOT: 2,6-dimethyl-1,3,6-octatriene

EXAMPLE 6

The reaction was carried out as in Example 1 but using the following catalysts, solvent and monomers. The after treatment was also carried out in like manner.

| Catalysts. | |
|---|---|
| Aluminum chloride | 0.8 gram |
| Trimethylchlorosilane | 0.8 gram |
| Solvent. | |
| Benzene | 17.7 grams |
| Monomers. | |
| DMVCH | 11.5 grams |
| Dimethyloctatrienes * | 4.9 grams |

* A mixture of 80 weight % of 2,6-dimethyl-1,3,6-octatriene and 20 weight % of 3,6-dimethyl-1,3,6-octatriene.

11.4 Grams of a copolymer was obtained. This copolymer had a softening point of 110°C. and a molecular weight of 900, while the number of double bonds contained per 100 carbon atoms was 5 and weight loss on heating was 1.5%. Furthermore, this copolymer contained 57 mol% of units derived from DMVCH and 43 mol% of units derived from dimethyloctatrienes.

EXAMPLE 7

The experiment was carried out by operating exactly as in Example 1 but using the following catalysts, solvent and monomers.

| Catalysts. | |
|---|---|
| Aluminum chloride | 0.8 gram |
| Benzyl chloride | 0.7 gram |
| Solvent. | |
| Benzene | 17.7 grams |
| Monomers. | |
| DMVCH | 11.5 grams |
| 3,6-dimethyl-1,3,6-octatriene (3,6-DMOT) | 4.9 grams |

The yield of the copolymer was 10.8 grams. The so obtained copolymer had a softening point of 94°C., and a molecular weight of 610, while the number of double bonds contained per 100 carbon atoms was 4 and weight loss on heating was 1.5%. Furthermore, this copolymer contained 58 mol% of units derived from DMVCH and 42 mol% of units derived from 3,6-DMOT.

EXAMPLE 8

The following catalysts, solvent and monomers were used, but the reaction was otherwise carried out exactly as in Example 1 followed by the same after treatment.

| Catalysts. | |
|---|---|
| Stannic chloride | 0.7 gram |
| Tertiary butyl chloride | 0.8 gram |
| Solvent. | |
| Methylene chloride | 17.7 grams |
| Monomers. | |
| DMVCH | 11.5 grams |
| 2,6-dimethyl-1,3,6-octatriene (2,6-DMOT) | 4.9 grams |

The yield of the copolymer was 10.4 grams. This copolymer had a softening point of 102°C. and a molecular weight of 860, while the number of double bonds contained per 100 carbon atoms was 4 and weight loss on heating was 1.5%. Furthermore, this copolymer contained 55 mol% of units derived from DMVCH and 45 mol% of units derived from 2,6-DMOT.

EXAMPLE 9

The following catalysts, solvent and monomers were used, but the reaction was otherwise carried out exactly as in Example 1 followed by the same after treatment.

| Catalyst. | |
|---|---|
| Ethylaluminum chloride | 0.8 gram |
| Ethyl chloride | 0.8 gram |
| Solvent. | |
| Methylene chloride | 26.2 grams |
| Monomers. | |
| DMVCH | 9.8 grams |
| 3,6-dimethyl-1,3,6-octatriene | 6.6 grams |

The yield of copolymer was 13.0 grams. The softening point of this copolymer was 131.0°C. and molecular weight was 1350, the number of double bonds contained per 100 carbon atoms was 5 and weight loss on heating was 1.5%. Furthermore, this copolymer contained 51 mol% of units derived from DMVCH and 49 mol % of units derived from 3,6-DMOT.

EXAMPLE 10

A four-necked 100-ml flask fitted with a stirrer, a thermometer, a dropping funnel and a gas inlet line was purged with nitrogen, after which it was charged with 35.2 grams of benzene and 0.495 gram of anhydrous aluminum chloride. After the mixture was rendered into a slurry, 1.27 grams of benzyl chloride was added as co-catalyst, and the temperature was adjusted to 0°–5°C. A mixture of 20.1 grams of DMVCH, 9.1 grams of 2,6-DMOT and 3.6 grams of vinyltoluene was placed in a dropping funnel and added dropwise to the foregoing mixture a period of 30–40 minutes. After completion of the addition, the reaction temperature was immediately raised to 30°C. and held at this temperature while continuing the stirring of the reaction mixture for 4 hours. This was followed by the addition of 3.5 grams of an aqueous caustic potash solution to the reaction mixture to deactivate the catalyst. Next, the reaction mixture was washed five times in water to remove the residual catalyst and alkali, followed by steam distillation to remove the benzene, unreacted monomers and oily low molecular weight substances. 31.5 grams of a light yellow copolymer was thus obtained. This copolymer had a softening point of 104°C. and a molecular weight of 900, while the number of double bonds contained per 100 carbon atoms was 5 and weight loss on heating was 1.6%. Furthermore, this copolymer contained 60 mol% of units derived from DMVCH, 29 mol% of units derived from 2,6-DMOT and 11 mol% of units derived from vinyltoluene.

EXAMPLE 11

The copolymerization reaction was carried out in accordance with the procedure described in Example 10 with the apparatus described therein, using the following catalyst, co-catalyst, reaction solvent and starting materials.

| | |
|---|---|
| Aluminum chloride | 0.405 gram |
| Benzyl chloride | 1.27 grams |
| Benzene | 35.2 grams |
| DMVCH | 19.7 grams |
| 2,6-DMOT | 6.5 grams |
| Isoprene | 5.5 grams |

While the dropping was being carried out for 30–40 minutes, the temperature of the reaction mixture was held at 0°–5°C. After completion of the dropping, the reaction was carried out for 4 hours while maintaining the temperature of the reaction mixture at 30°C. 29.8 grams of a light yellow resin having a softening point of 101°C. and a molecular weight of 800 was thus obtained. The number of double bonds contained in this copolymer was 5, and its weight loss on heating was 1.6%. Furthermore, this copolymer contained 60 mol% of units derived from DMVCH, 22 mol% of units derived from 2,6-DMOT and 18 mol% of units derived from isoprene.

TEST 1

Coating compositions obtained by incorporating in natural rubber as tackifiers 40% of the copolymers obtained in Examples 1–5, 11, 12 and Control 1 were applied to polypropylene film to prepare adhesive tapes. The performances of these tapes were compared with the performances of adhesive tapes obtained in similar manner but using commercial resins. The results obtained are shown in Table 2.

TEST 2

Hot-melt adhesiveness test

One hundred parts of the resin obtained in Example 1, 100 parts of paraffin wax (m. p. 145°C.) and as an antioxidant 0.5 part of 2,6-di-tertbutyl-p-cresol were added to 100 parts of an ethylene-vinyl acetate copolymer (No. 220 produced by Mitsui Polychemical Company, vinyl acetate content 28%, MI = 150), following which the mixture was melt blended by heating at 180°C. with stirring. When this hot-melt type adhesive was measured for its physical properties, it was found to be an adhesive having satisfactory flexibility, its melt viscosity (170°C.) being 400 centipoises, and its cloud point being 110°C. as measured by the JIS Method K 2266. Furthermore, when this adhesive was formed into a sheet, sandwiched between two sheets of aluminum and pressed to form a laminate, which was then measured for its T-type stripping strength, it was 2 kilograms per inch.

EXAMPLES 12–21

Example 10 was repeated but using the starting materials shown in Table 3 to carry out the polymerization reactions. The compositions and physical properties of the resulting copolymers are shown in Table 3.

Table 3

| | Monomer Composition | | | Copolymer Composition | | | Physical Properties | | | | |
|---|---|---|---|---|---|---|---|---|---|---|---|
| Examples | DMVCH (g) | 2,6-DMOT (g) | Third Component (g) | DMVCH (mol%) | 2,6-DMOT (mol%) | Third Component (mol%) | Yield (g) | Softening Point (°C) | Molecular Weight | Number of Double Bonds Per 100 Carbon Atoms | % Weight Loss on Heating (150°C., 10 hours) |
| 12 | 19.7 | 6.3 | piperylene 3.0 | 66 | 23 | 11 | 27.2 | 100.0 | 900 | 4 | 1.6 |
| 13 | 22.1 | 7.1 | cyclopentadiene 3.7 | 63 | 24 | 13 | 29.5 | 108.5 | 850 | 4 | 1.7 |
| 14 | 14.8 | 12.0 | vinyltoluene 3.7 | 43 | 44 | 13 | 27.5 | 109 | 950 | 6 | 1.5 |
| 15 | 19.7 | 6.3 | isoprene 3.0 | 66 | 23 | 11 | 27.5 | 101.0 | 800 | 5 | 1.7 |
| 16 | 20.1 | 9.1 | α-methylstyrene 5.0 | 57 | 28 | 15 | 33.0 | 98 | 680 | 5 | 1.5 |
| 17 | 19.5 | 6.5 | butadiene 5.0 | 61 | 22 | 17 | 29.8 | 103 | 780 | 5 | 1.9 |
| 18 | 20.1 | 6.8 | styrene 3.7 | 64 | 23 | 13 | 29.5 | 103 | 760 | 5 | 1.6 |
| 19 | 22.5 | 14.2 | isobutylene 3.0 | 52 | 40 | 8 | 35.6 | 108 | 900 | 6 | 1.7 |
| 20 | 19.9 | 10.2 | vinylcyclohexene 5.0 | 55 | 30 | 15 | 33.8 | 99 | 700 | 6 | 1.8 |
| 21 | 19.7 | 7.1 | α-pinene 3.0 | 64 | 25 | 11 | 28.0 | 103 | 780 | 5 | 1.9 |

Adhesive tapes were prepared as described in Test 1 using the so-obtained copolymers, and the resulting tapes were measured for their tack, cohesion and adhesiveness with the results shown in Table 4.

Table 2

| | Coating Composition Using Invention Copolymer | | | | | Coating Composition Using Commercial Resins | | Coating Composition Using Copolymer of Control 1 |
|---|---|---|---|---|---|---|---|---|
| | Ex. 1 | Ex. 2 | Ex. 3 | Ex. 4 | Ex. 5 | Terpene Resin | Aliphatic Petroleum Resin | |
| Tack* (cm) | 2.5 | 1.5 | 2.5 | 3.0 | 6.5 | 3 | 16 | 8.5 |
| Adhesiveness** (g/2.5 cm) | 700 | 400 | 680 | 700 | 780 | 600 | 600 | 790 |
| Cohesion*** (kg/cm²) | 3.3 | 2.2 | 3.3 | 3.4 | 3.5 | 2.6 | 2.6 | 3.7 |

*Tack was determined in accordance with the ball tack testing method with a ball diameter of 8/32 inch.

**Adhesiveness is the 180 degree stripping strength measured in accordance with ASTM D-1000-66.
***Cohesion is the tensile shear strength measured in accordance with ASTM D-2295.

Table 4

| Example | Tack (cm) | Cohesion (g/2.5 cm) | Adhesiveness (kg/cm²) |
|---|---|---|---|
| 12 | 3.9 | 700 | 3.6 |
| 13 | 6.3 | 700 | 3.5 |
| 14 | 6.8 | 720 | 4.0 |
| 15 | 6.0 | 730 | 3.6 |
| 16 | 4.0 | 700 | 3.4 |
| 17 | 6.0 | — | — |
| 18 | 5.8 | 730 | 3.9 |
| 19 | 8.0 | — | — |
| 20 | 7.2 | 700 | 3.2 |
| 21 | 5.0 | 680 | 3.6 |

We claim:

1. A copolymer of 2,4-dimethyl-4-vinyl-1-cyclohexene and at least one member of the group consisting of 2,6- and 3,6-dimethyl-1,3,6-octatrienes, which copolymer is suitable for use as a tackifier, said copolymer consisting essentially of the reaction product of: (A) structural units of 2,4-dimethyl-4-vinyl-1-cyclohexene; (B) structural units of at least one member selected from the group consisting of 2,6- and 3,6-dimethyl-1,3,6-octatrienes in proportions of 100 moles of (A) to 1 to 400 moles of (B); and optionally (C) from 1 to 50 moles per 100 moles of component (A), at least one unsaturated compound selected from the group consisting of isoprene, butadiene piperylene, cyclopentadiene, styrene, vinyltoluene, alpha-methylstyrene, isobutylene, vinylcyclohexene and alpha-pinene, and characterized by containing not more than seven unsaturated double bonds per 100 carbon atoms per copolymer molecule, and having a softening point of 85°–160°C. and a number average molecular weight of 450–1850.

2. The copolymer of claim 1 in which the weight loss on heating as measured under the conditions of 10 hours at 150°C. is not greater than 2 percent.

3. The copolymer of claim 1 in which component C is present.

4. The copolymer of claim 3 in which the weight loss on heating as measured under the conditions of 10 hours at 150°C. is not greater than 2 percent.

5. A process for preparing a copolymer of 2,4-dimethyl-4-vinyl-1-cyclohexene and at least one member of the group consisting of 2,6- and 3,6-dimethyl-1,3,6-octatrienes which comprises copolymerizing 2,4-dimethyl-4-vinyl-1-cyclohexene with at least one member selected from the group consisting of 2,6- and 3,6-dimethyl-1,3,6-octatrienes in a molar ratio of 100:1–100:300 in the presence of a cationic polymerization catalyst.

6. The process of claim 5 wherein said reaction is carried out in a polymerization solvent.

7. The process of claim 5 wherein said polymerization reaction is conducted at a temperature of from −80° to 80°C.

8. The process of claim 5 wherein an organic halide co-catalyst is used in conjunction with said cationic polymerization catalyst.

9. The copolymer of claim 1 wherein the softening point is from about 90° to 130°C.

10. The copolymer of claim 1 wherein the softening point is from about 100° to 120°C.

11. The copolymer of claim 1 wherein the amount of (B) is from 30 to 150 moles per 100 moles of (A).

12. The copolymer of claim 11 wherein the amount of (B) is from 60 to 100 moles per 100 moles of (A).

13. The process of claim 7 wherein the reaction is conducted at a temperature of from 0° to 40°C.

14. The process of claim 5 wherein the reaction is conducted at a pressure of 1 to 20 kg/cm².

15. The process of claim 14 wherein the reaction is conducted at a pressure of 1 to 5 kg/cm².

16. The process of claim 5 wherein the reaction time is from several minutes to 10 hours.

17. The process of claim 16 wherein the reaction time is from 30 minutes to several hours.

18. The process of claim 5 wherein the amount of the cationic polymerization catalyst is from 0.05 to 15% by weight based on the starting monomeric mixture.

19. The process of claim 18 wherein the amount of the cationic polymerization catalyst is from 3 to 6% by weight based on the starting monomeric mixture.

20. The process of claim 18 wherein the amount of the cationic polymerization catalyst is from 0.25 to 8% by weight based on the starting monomeric mixture.

21. The process of claim 20 wherein the amount of the cationic polymerization catalyst is from 0.8 to 6% by weight based on the starting monomeric mixture.

* * * * *

UNITED STATES PATENT OFFICE
CERTIFICATE OF CORRECTION

Patent No. 3,939,131           Dated February 17, 1976

Inventor(s) Hiroyuki Morikawa, et al

It is certified that error appears in the above-identified patent and that said Letters Patent are hereby corrected as shown below:

Item 73, delete "Mitsui Petrochemical Industries, Inc.", insert
-- Mitsubishi Petrochemical Co., Ltd. --

Signed and Sealed this first Day of June 1976

[SEAL]

Attest:

RUTH C. MASON
Attesting Officer

C. MARSHALL DANN
Commissioner of Patents and Trademarks